US012592082B2

(12) United States Patent    (10) Patent No.:   US 12,592,082 B2

Yu      (45) Date of Patent:    Mar. 31, 2026

(54) DEVICE AND METHOD FOR PROVIDING INFORMATION FOR VEHICLE USING ROAD SURFACE

(71) Applicant: HYUNDAI MOBIS CO., LTD., Seoul (KR)

(72) Inventor: Han Seong Yu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 602 days.

(21) Appl. No.: 17/808,715

(22) Filed: Jun. 24, 2022

(65) Prior Publication Data

US 2023/0056501 A1    Feb. 23, 2023

(30) Foreign Application Priority Data

Aug. 23, 2021    (KR) ........................ 10-2021-0110818

(51) Int. Cl.
   *G06K 9/00*      (2022.01)
   *B60W 40/06*      (2012.01)
   *G06V 20/58*      (2022.01)

(52) U.S. Cl.
   CPC ............. *G06V 20/58* (2022.01); *B60W 40/06* (2013.01); *B60W 2420/403* (2013.01)

(58) Field of Classification Search
   CPC ......... G06V 20/58; B60W 40/06; B60Q 1/24; B60Q 1/34
   See application file for complete search history.

(56) References Cited

U.S. PATENT DOCUMENTS

| | | | | |
|---|---|---|---|---|
| 2018/0180247 A1 * | 6/2018 | Park | .................. | F21S 41/285 |
| 2020/0231085 A1 * | 7/2020 | Kunii | ............... | B60K 31/0008 |

FOREIGN PATENT DOCUMENTS

| | | | | | |
|---|---|---|---|---|---|
| KR | 20180123908 A | * | 11/2018 | ............... | B60Q 1/06 |
| WO | WO-2019149409 A1 | * | 8/2019 | ........... | F21S 41/675 |
| WO | WO-2021090668 A1 | * | 5/2021 | ............. | B60Q 1/507 |

* cited by examiner

*Primary Examiner* — Molly Wilburn
*Assistant Examiner* — Aidan Keup
(74) *Attorney, Agent, or Firm* — DLA PIPER LLP US

(57) ABSTRACT

A device and method for providing information for a vehicle. The device includes an object recognition module that photographs a front image of the vehicle and recognizes an object located outside the vehicle, a processor that recognizes a road surface as a road irradiation area, a sidewalk irradiation area, and a boundary area between the road irradiation area and the sidewalk irradiation area based on the photographed front image, and separately generates a driving information image and a walking information image based on the photographed front image, and an image output module that irradiates the driving information image adjusted to a size corresponding to the road irradiation area to the road irradiation area and irradiates the walking information image adjusted to a size corresponding to the sidewalk irradiation area to the sidewalk irradiation area.

18 Claims, 16 Drawing Sheets

<IMAGE ACQUISITION>

<IMAGE GENERATION>

100

150

151 — STEERING SENSOR

152 — VEHICLE SPEED SENSOR

153 — VEHICLE HEIGHT SENSOR

OBJECT RECOGNITION MODULE — 110

PROCESSOR — 120

OUTPUT DRIVER — 130

IMAGE OUTPUT MODULE — 140

<IMAGE ACQUISITION>

<IMAGE GENERATION>

DEVICE AND METHOD FOR PROVIDING INFORMATION FOR VEHICLE USING ROAD SURFACE

CROSS-REFERENCE TO RELATED APPLICATION

This application claims the benefit of priority to Korean Patent Application No. 10-2021-0110818, filed in the Korean Intellectual Property Office on Aug. 23, 2021, the entire contents of which are incorporated herein by reference.

TECHNICAL FIELD

The present disclosure relates to a device and method for providing information for a vehicle using a road surface.

BACKGROUND

With the development of the vehicle industry, the supply of vehicles has become popular, but since vehicles can lead to fatal accidents in the event of an accident, various studies are being conducted to improve the safety of vehicles. In particular, research on detecting an object located in front of the vehicle and then providing a driving information image necessary for safe driving to the road surface based on the detected object is being conducted.

SUMMARY

The present disclosure has been made to solve the above-mentioned problems occurring in the prior art while advantages achieved by the prior art are maintained intact.

Since the driving information image is irradiated to a road surface, the driving information image may be distorted depending on conditions of the road surface. For example, when the vehicle turns right, the driving information image may be irradiated to the curbstone area and the sidewalk area and may be distorted, thereby causing confusion for drivers and pedestrians. Also, when the road surface is not flat, distortion on the driving information image may occur.

An aspect of the present disclosure provides a device and method for providing information for a vehicle capable of minimizing distortion of a driving information image irradiated on a road surface.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for providing information for a vehicle includes an object recognition module that take a front image of the vehicle and recognizes an object located outside the vehicle, a processor that recognizes a road surface as a road irradiation area, a sidewalk irradiation area, and a boundary area between the road irradiation area and the sidewalk irradiation area based on the front image, and to generate a driving information image and a walking information image based on the front image, and an image output module that irradiates the driving information image adjusted to a size corresponding to the road irradiation area to the road irradiation area and irradiates the walking information image adjusted to a size corresponding to the sidewalk irradiation area to the sidewalk irradiation area.

According to an embodiment, the object recognition module may include a TOF (Time of Flight) module that obtains the front image of the vehicle, and a first actuator that controls a rotational operation of the TOF module, wherein the image output module may include a DMD (Digital Micromirror Device) module that irradiates the walking information image and the driving information image onto the road surface, and a second actuator that controls a rotational operation of the DMD module.

According to an embodiment, at least one of the TOF module or the DMD module may rotate toward the road surface corresponding to a driving direction when the driving direction of the vehicle is selected as a left turn or a right turn by a driver.

According to an embodiment, the processor may detect the driving directions of the left turn or the right turn based on information on a blinking of a turn indicator.

According to an embodiment, the first actuator may control the rotational operation of the TOF module while following the object when the vehicle is traveling forward, and the processor may correct the walking information image depending on a changed distance between the vehicle and the object.

According to an embodiment, the first actuator may control the rotational operation of the TOF module such that a rotational angle of the TOF module increases as a distance between the vehicle and the object becomes closer.

According to an embodiment, the device for providing information for the vehicle may further include a vehicle height sensor that detects a tilt of the vehicle and generates a tilt sensing signal, wherein the TOF module may detect a recognition area ratio with respect to the road surface when the vehicle is traveling, and the first actuator may determine whether the vehicle is traveling on a slope based on the tilt sensing signal and the recognition area ratio and may rotate the TOF module such that the TOF module faces the road surface of the slope when it is determined that the vehicle is traveling on the slope.

According to an embodiment, the object recognition module may recognize a protruding obstacle of the road surface, and the image output module may output the driving information image for mapping at least two surfaces of the protruding obstacle with complementary colors.

According to an embodiment, the object recognition module may recognize a recessed obstacle of the road surface, and the image output module may output the driving information image for dividing the recessed obstacle into a plurality of areas and mapping the divided obstacle with at least two colors.

According to an embodiment, the vehicle may include at least one lamp module emitting light to a front of the vehicle, and at least one of the object recognition module or the image output module may be built into the lamp module.

According to an aspect of the present disclosure, a method for providing information for a vehicle includes taking a front image of the vehicle and recognizing an object located outside the vehicle, recognizing a road surface as a road irradiation area, a sidewalk irradiation area, and a boundary area between the road irradiation area and the sidewalk irradiation area, based on the front image, separately generating a driving information image and a walking information image based on the front image, and irradiating the driving information image adjusted to a size corresponding to the road irradiation area to the road irradiation area, and irradiating the walking information image adjusted to a size corresponding to the sidewalk irradiation area to the sidewalk irradiation area.

BRIEF DESCRIPTION OF THE DRAWINGS

The above and other objects, features and advantages of the present disclosure will be more apparent from the following detailed description taken in conjunction with the accompanying drawings.

In connection with the description of the drawings, the same or similar reference numerals may be used for the same or similar components.

DETAILED DESCRIPTION

Hereinafter, some embodiments of the present disclosure will be described in detail with reference to the drawings. However, those of ordinary skill in the art will recognize that modification, equivalent, and/or alternative on various embodiments described herein can be variously made without departing from the scope and spirit of the disclosure.

Figure 1:
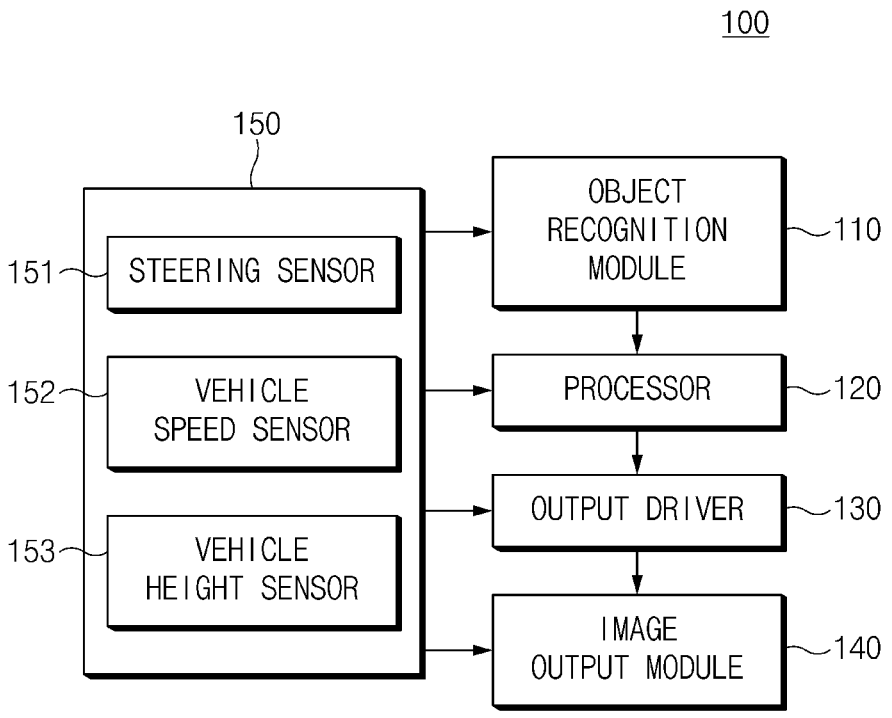
FIG. 1 is a block diagram illustrating a configuration of a vehicle including an information providing device disclosed in the present disclosure.

FIG. 1 is a block diagram illustrating a configuration of a vehicle including an information providing device disclosed in the present disclosure.

Referring to FIG. 1, an information providing device 100 for a vehicle according to various embodiments may include a driving sensor module 150, an object recognition module 110, a processor 120, an image output module 140, and an output driver 130.

The driving sensor module 150 may detect a driving environment of the vehicle. The driving sensor module 150 may include a steering sensor 151, a vehicle speed sensor 152, and a vehicle height sensor 153. The steering sensor 151 may detect a steering angle of the vehicle. The vehicle speed sensor 152 may detect a vehicle speed of the vehicle. The vehicle height sensor 153 may detect a tilt of the vehicle. In addition, the vehicle may include various sensors such as a brake sensor, an audio sensor, a fuel sensor, a battery sensor, and a door sensor.

The object recognition module 110 may photograph a front image of the vehicle to recognize objects existing in the vicinity of the vehicle, may obtain photographed front image information, and may transmit it to the processor 120. The object recognition module 110 may photograph a road surface of a sidewalk as well as a road surface of a driveway. The object recognition module 110 may acquire the front image information including road-related image information and sidewalk-related image information. The road-related image information may be image information of an object such as a shape of a road, information on a lane of a road, and various structures of a road (e.g., curbs, median strips, guard rails, traffic lights, signs, road marks, and street trees). The sidewalk-related image information may be image information of an object such as a shape of a sidewalk, a fixed structures of a sidewalk (e.g., a building), and a non-fixed thing of a sidewalk (e.g., a pedestrian, an animal).

The object recognition module 110 may acquire the front image information as a 3D image by using a time of flight (TOF) function. The object recognition module 110 may include a TOF module including a transmitter, a receiver, and a camera. The object recognition module 110 may measure a distance between an object and the vehicle. The object recognition module 110 may measure a distance between the object and the vehicle by calculating a time until infrared rays reflected from objects outside the vehicle, such as road surfaces, pedestrians, or buildings, reach the receiver, after emitting the infrared rays through the transmitter. The object recognition module 110 may acquire the front image information as a 3D image by mapping the measured distance and a 2D front image taken with the camera. Meanwhile, the TOF module may be used as a TOF sensor or a TOF camera.

Figure 2:
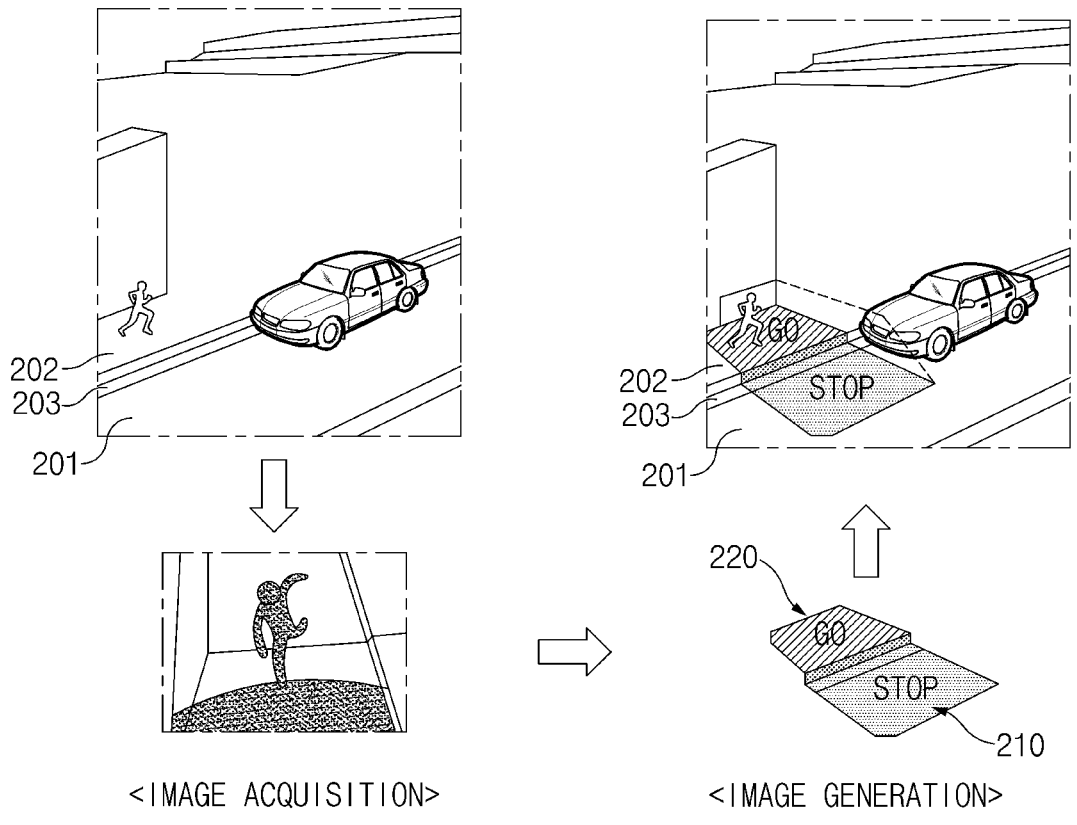
FIG. 2 is a diagram for describing an image acquisition operation and an image output operation using an information providing device illustrated in FIG. 1.
Figure 3:
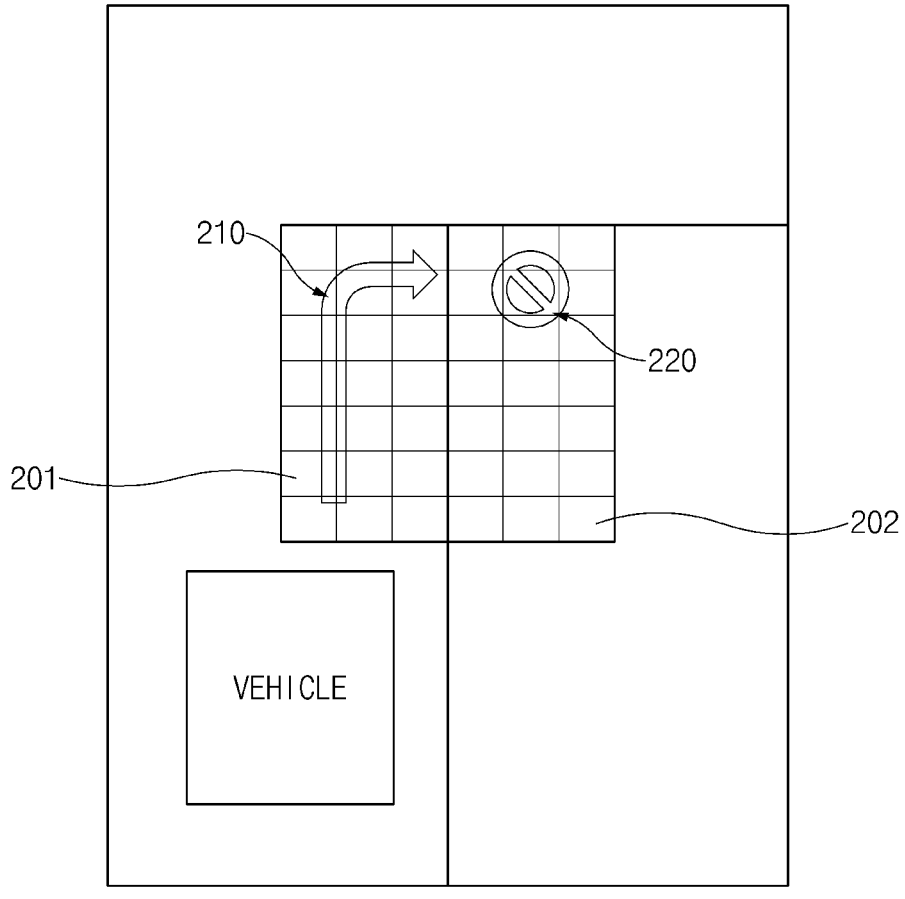
FIG. 3 is a diagram illustrating an information image irradiated to each of a road irradiation area and a sidewalk irradiation area illustrated in FIG. 2.

As illustrated in FIGS. 2 and 3, the processor 120 may recognize the road surface as at least one of a boundary area 203, a road irradiation area 201, or a sidewalk irradiation area 202, or any combination thereof, based on the image information obtained through the object recognition module 110. The boundary area 203 may be an area (e.g., a curb-stone) between the road irradiation area 201 and the sidewalk irradiation area 202. The processor 120 may generate an information image to be irradiated on at least one of the road irradiation area 201, the sidewalk irradiation area 202, or the boundary area 203, or any combination thereof.

According to an embodiment, the processor 120 may generate a driving information image 210 to be irradiated on the road irradiation area 201 and a walking information image 220 to be irradiated on the sidewalk irradiation area 202, based on the image information acquired through the object recognition module 110. The driving information image 210 may be an image capable of providing convenience to a driver who drives a vehicle, and the walking information image 220 may be an image providing convenience (e.g., a communication function) to a pedestrian.

According to another embodiment, the processor 120 may generate information images to be irradiated to each of the road irradiation area 201, the sidewalk irradiation area 202, and the boundary area 203 to have different background colors. Accordingly, the visibility of drivers and pedestrians with respect to the information image to be irradiated to each of the road irradiation area 201, the sidewalk irradiation area 202, and the boundary area 203 may be improved.

As described above, in the embodiment, since the boundary area 203 between the road irradiation area 201 and the sidewalk irradiation area 202 may be recognized through the processor, a driving information image may be provided in the road irradiation area and a walking information image may be provided in the sidewalk irradiation area 202. Accordingly, since it is possible to prevent the driving information image 210 and the walking information image 220 from overlapping in the boundary area 203 between the road irradiation area 201 and the sidewalk irradiation area 202, it is possible to prevent the driving information image 210 and the walking information image 220 from being distorted.

The output driver 130 may generate mirror control information for controlling operations of a plurality of mirrors included in the image output module 140, based on the driving information image and the walking information image received from the processor 120. The output driver 130 may generate a mirror control signal capable of individually controlling a tilt angle of each of the plurality of mirrors included in the image output module 140. The mirror control signal may be a signal capable of individually turning on or off the plurality of mirrors based on the driving information image and the walking information image.

The image output module 140 may include a panel for a micro display (MD) or a scanner using a projector projection method such as a digital micromirror device (DMD) or a liquid crystal on silicon (LCOS).

For example, the image output module 140 may include a plurality of micromirrors arranged in a matrix form. Each of the plurality of mirrors may correspond to one pixel. The plurality of mirrors may reflect incident visible light by being tilted at a predetermined angle in response to on/off of the mirror control signal of the output driver 130. The luminance of the image irradiated to the road surface may be adjusted through a ratio of the on-state time of the mirror control signal to the off-state time of the mirror control signal.

The image output module 140 may irradiate a corresponding image to the sidewalk irradiation area 202 and the road irradiation area 201 under the control of the output driver 130. The image output module 140 may display the driving information image 210 on the road irradiation area 201 as illustrated in FIGS. 2 and 3. The driving information image 210 may be irradiated onto the road irradiation area 201 by adjusting the magnification to fit the road irradiation area 201. The image output module 140 may display the walking information image 220 on the sidewalk irradiation area 202 as illustrated in FIGS. 2 and 3. The walking information image 220 may be irradiated onto the sidewalk irradiation area 202 by adjusting the magnification to fit the sidewalk irradiation area 202. The driving information image 210 and the walking information image 220 may be 3D images to which 3D mapping technology is applied. The image output module 140 may irradiate or may not irradiate a separate information image different from the driving information image 210 and the walking information image 220 on the boundary area 203.

According to various embodiments, at least one of the object recognition module 110, the processor 120, the output driver 130, or the image output module 140, or any combination thereof, may be embedded in a lamp module (e.g., a headlamp) that emits light to the front of the vehicle. For example, the object recognition module 110 and the image output module 140 may be embedded in the lamp module.

According to various embodiments, the vehicle may include a first headlamp disposed on one side of the vehicle and a second headlamp disposed on the other side of the vehicle. Accordingly, the image output module 140 included in at least one of the first headlamp or the second headlamp, or any combination thereof, may irradiate the walking information image 220 to the sidewalk irradiation area 202, and the image output module 140 included in at least one of the first headlamp or the second headlamp, or any combination thereof, may irradiate the driving information image 210 to the road irradiation area 201. For example, when there is a pedestrian on the right (or the left) side of the vehicle, the image output module 140 included in the headlamp disposed on the right (or the left) side of the vehicle among the first headlamp and the second headlamp may irradiate the driving information image 210 and the walking information image 220. For another example, when there is a pedestrian on the right (or the left) side of the vehicle, the image output module 140 included in the headlamp disposed on the right (or the left) side of the vehicle among the first headlamp and the second headlamp may irradiate the walking information image 220 to the sidewalk irradiation area 202. The image output module 140 included in the headlamp disposed on the left (or right) side of the vehicle among the first headlamp and the second headlamp may irradiate the driving information image 210 to the road irradiation area 201. As another example, when there is a pedestrian on the right (or left) side of the vehicle, the image output module 140 included in each of the first headlamp and the second headlamp may irradiate the driving information image 210 and the walking information image 220.

Figure 4:
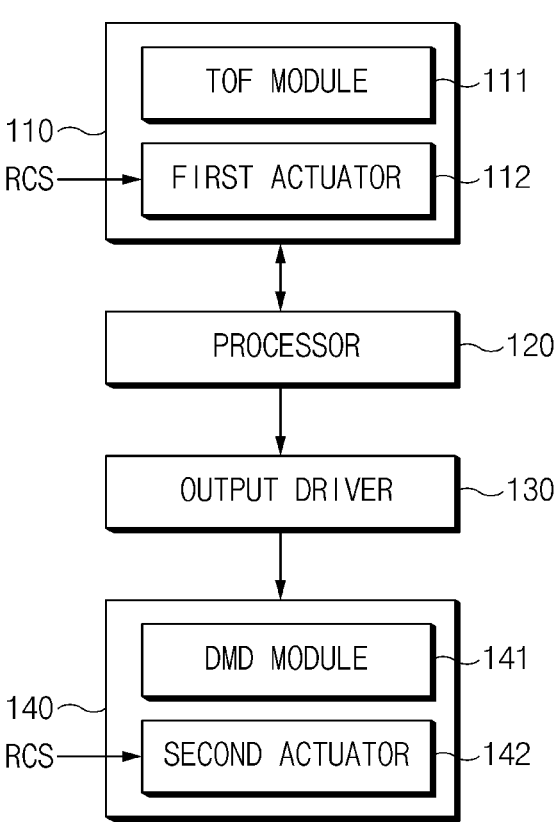
FIG. 4 is a block diagram illustrating an information providing device including first and second actuators disclosed in the present disclosure.

FIG. 4 is a block diagram illustrating the information providing device 100 including first and second actuators disclosed in the present disclosure.

Referring to FIG. 4, the information providing device 100 for the vehicle may include the object recognition module 110 including a first actuator 112, the processor 120, the output driver 130, and the image output module 140 including a second actuator 142.

The processor 120 may generate a rotation control signal RCS by sensing information on blinking of a turn indicator or information on a direction change selected by a driver. For example, the processor 120 may generate a left turn control signal RCS when the driver selects the driving direction of the vehicle as a left turn using a turn indicator. The processor 120 may generate a right turn control signal RCS when the driver selects the driving direction of the vehicle as a right turn.

The object recognition module 110 may include at least one TOF module 111 or the first actuator 112, or any combination thereof. The first actuator 112 may determine rotation parameters such as whether the TOF module 111 rotates, a rotation direction, and a rotational angle according to whether the rotation control signal RCS from the processor 120 is input.

When the rotation control signal RCS is not input from the processor 120, the first actuator 112 may control the rotational operation of the TOF module 111 such that the TOF module 111 faces the road ahead. The TOF module 111 whose position is controlled to face the road may acquire road-related image information except for sidewalk-related image information by photographing the front view with a focus on the road.

Figure 5A:
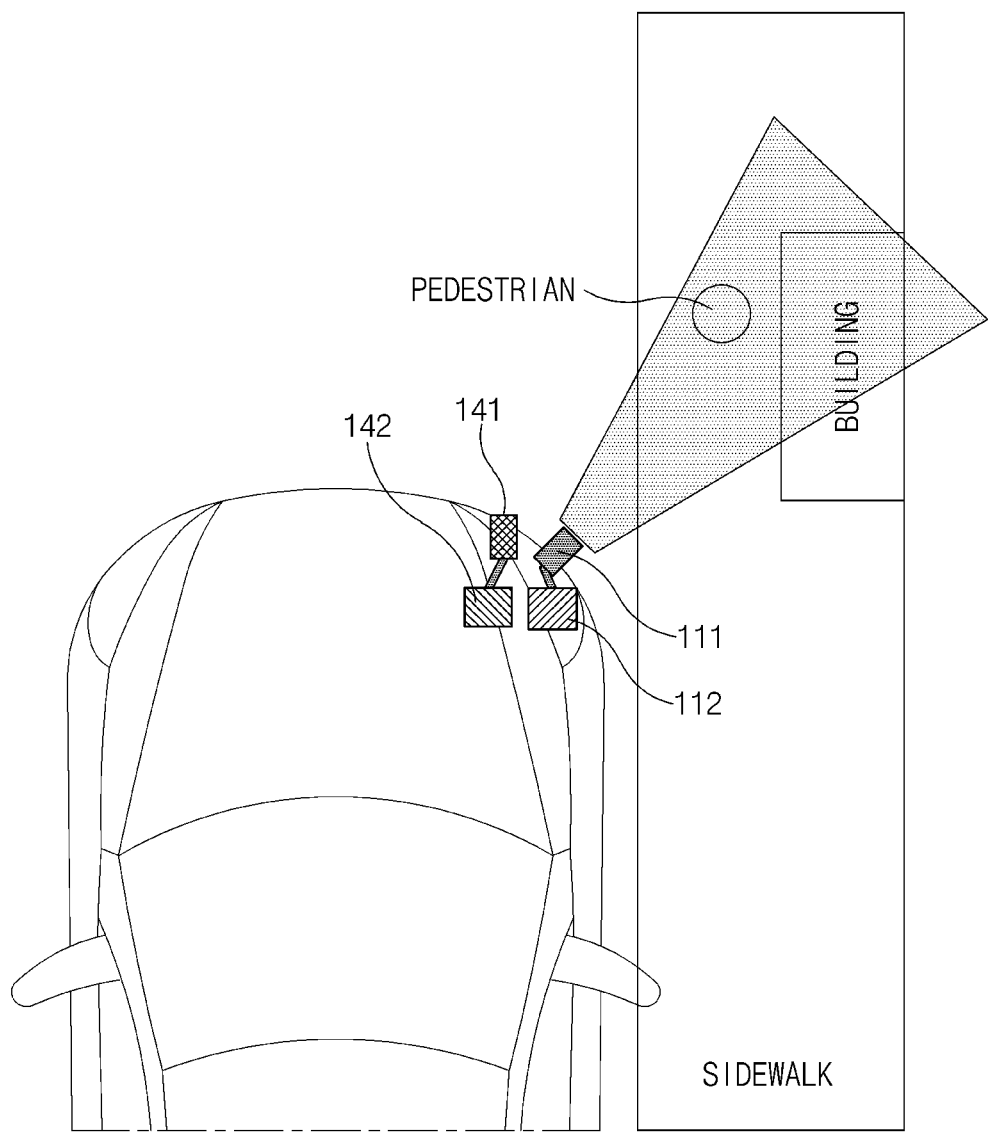
FIGS. 5A and 5B are diagrams for describing operations of a rotational object recognition module and a rotational image output module disclosed in the present disclosure.

The first actuator 112 may rotate the TOF module 111 to the left (or right) side such that the TOF module 111 faces the sidewalk in front in response to a left turn (or right turn) control signal from the processor 120 as illustrated in FIG. 5A. The TOF module 111 whose position is controlled to face the sidewalk may acquire the road-related image information and the sidewalk-related image information by photographing the front view with a focus on the sidewalk.

As illustrated in FIG. 2, the processor 120 may recognize at least one of the boundary area 203, the road irradiation area 201, or the sidewalk irradiation area 202, or any combination thereof, based on the image information obtained through the object recognition module 110.

The processor 120 may generate the driving information image 210 to be irradiated to the road irradiation area 201 and the walking information image 220 to be irradiated to the sidewalk irradiation area 202, based on the image information obtained through the object recognition module 110. Accordingly, since it is possible to prevent the driving information image 210 and the walking information image 220 from overlapping in the boundary area 203 between the road irradiation area 201 and the sidewalk irradiation area 202, it is possible to prevent the driving information image 210 and the walking information image 220 from being distorted.

The image output module 140 may include at least one DMD module 141 or the second actuator 142, or any combination thereof. The second actuator 142 may determine rotation parameters such as whether the DMD module 141 rotates and a rotation direction according to whether the rotation control signal RCS from the processor 120 is input.

When the rotation control signal RCS is not input from the processor 120, the second actuator 142 may control the rotational operation of the DMD module 141 such that the DMD module 141 faces the road ahead. The DMD module 141 whose position is controlled to face the road may irradiate the driving information image 210 to the road irradiation area 201.

Figure 5B:
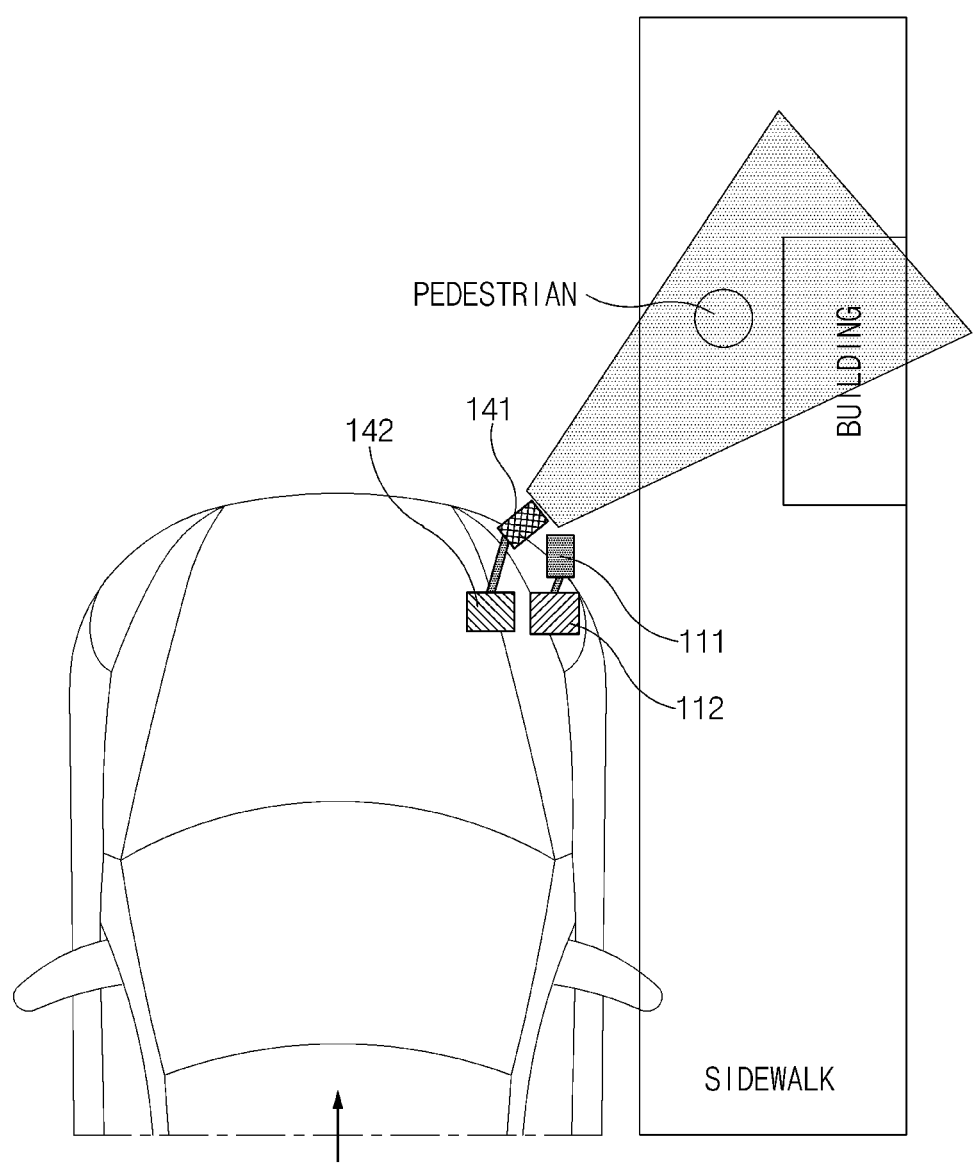

The second actuator 142 may rotate the DMD module 141 to the left (or right) side such that the DMD module 141 faces the sidewalk in front in response to the left turn (or right turn) control signal RCS from the processor 120 as illustrated in FIG. 5B. The DMD module 141 whose position is controlled to face the sidewalk may irradiate the walking information image 220 to the sidewalk irradiation area 202. The walking information image 220 may be irradiated on the sidewalk and the wall of the building such that pedestrians may recognize an information image.

According to an embodiment, at least one of the first actuator 112 or the second actuator 142, or any combination thereof, may be a means capable of generating power, such as a motor or a solenoid device.

Figure 6:
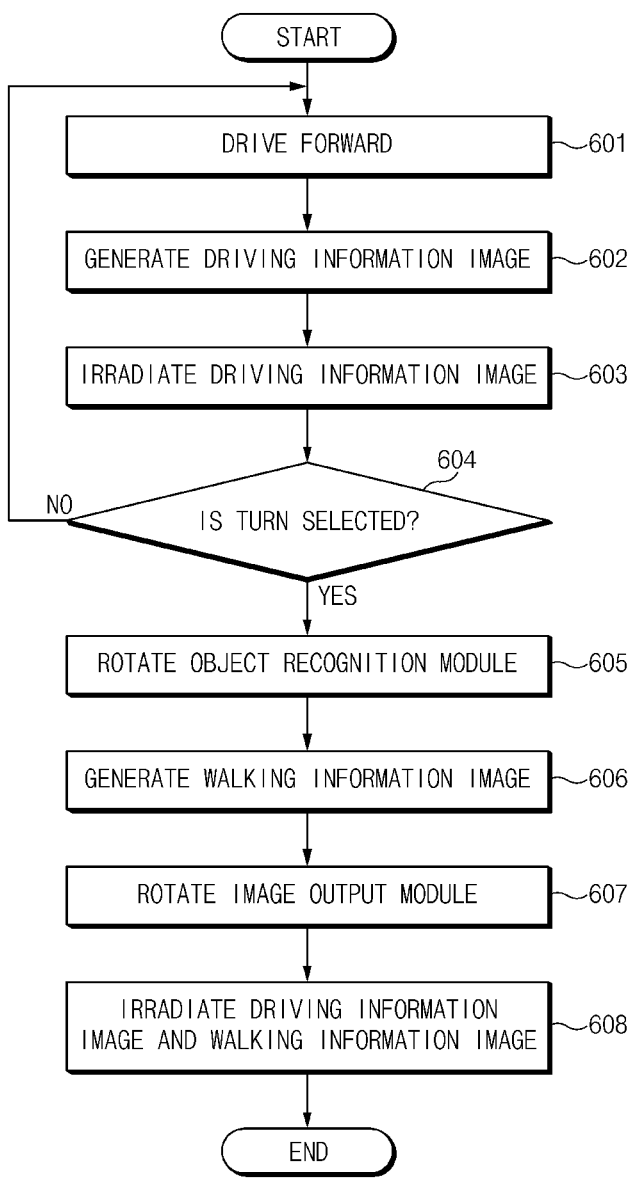
FIG. 6 is a flowchart illustrating an information image output method using an information providing device illustrated in FIG. 4.

FIG. 6 is a diagram illustrating a first embodiment of an image output method using the information providing device illustrated in FIG. 4. The image output method illustrated in FIG. 6 will be described in conjunction with the information providing device illustrated in FIG. 4.

Referring to FIGS. 4 and 6, in operation 601, the vehicle traveling in front may photograph the front of the vehicle through the object recognition module 110.

In operation 602, the processor 120 may generate a driving information image to be irradiated on the road irradiation area, based on the photographed image information.

In operation 603, the image output module 140 may irradiate the driving information image providing convenience to the driver on the road irradiation area of the road surface, under the control of the output driver 130.

In operation 604, when the driver selects the driving direction of the vehicle as a left turn or a right turn using a turn indicator, operation 605 may be performed. When there is no direction change of the vehicle using the turn indicator, operations 601, 602, and 603 may be sequentially performed.

In operation 605, when the driver selects the driving direction of the vehicle as the left turn or the right turn, the first actuator 112 rotates the TOF module 111 toward the sidewalk to correspond to the rotation direction of the vehicle to sense the front of the vehicle.

In operation 606, the processor 120 may generate a walking information image based on the front image of the vehicle acquired through the TOF module 111.

In operation 607, the second actuator 142 of the image output module 140 may rotate the DMD module 141 to correspond to the rotation direction of the vehicle.

In operation 608, the walking information image may be irradiated on the sidewalk irradiation area through the rotated DMD module 141. In this case, the driving information image may be irradiated on the road irradiation area through the DMD module 141. The DMD module 141 for irradiating the driving information image may be one DMD module integrated with the DMD module 141 for irradiating the walking information image, or may be a DMD module different from the DMD module 141 for irradiating the walking information image.

Figure 7A:
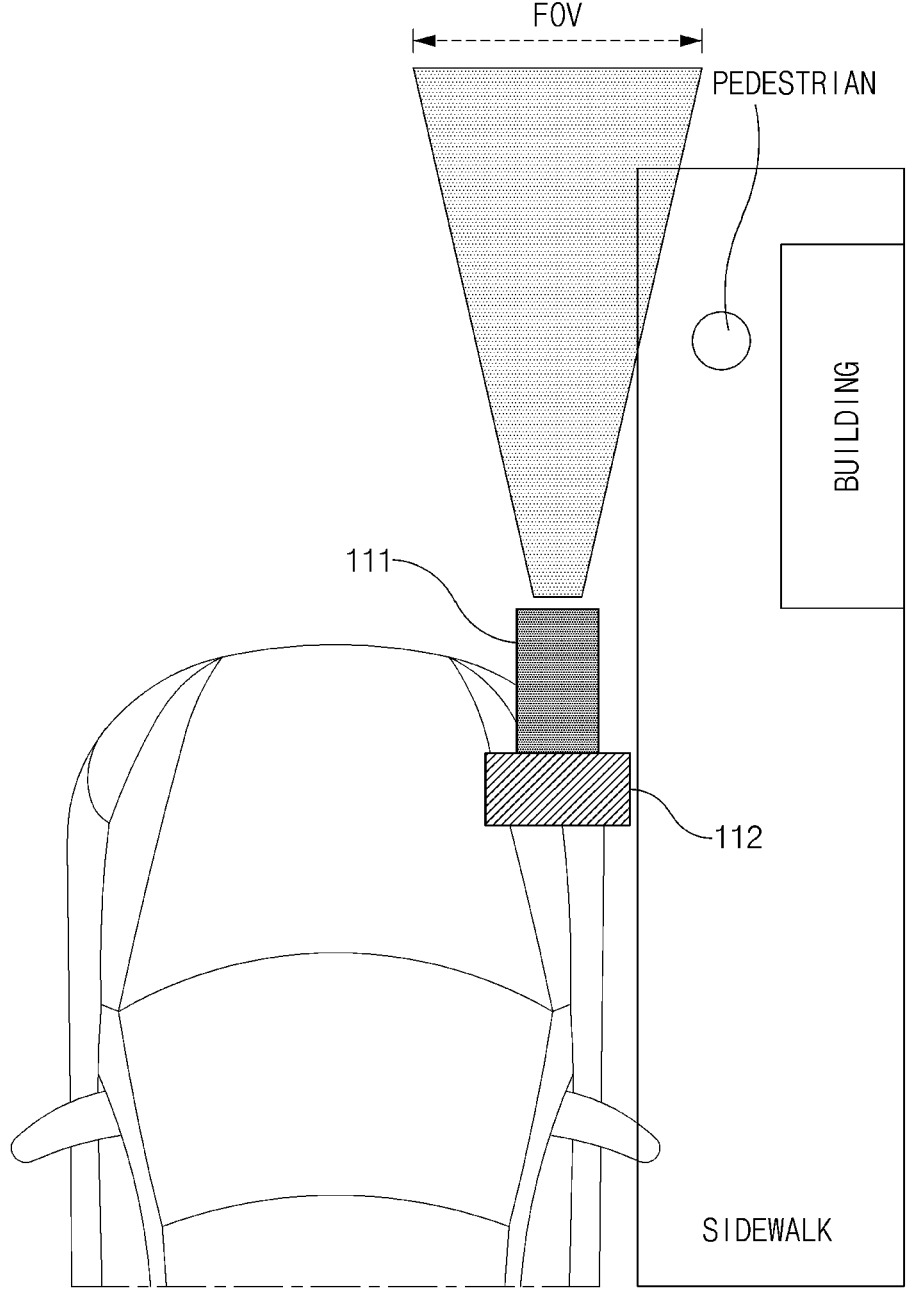
FIGS. 7A to 7C are diagrams for describing an operation of an object recognition module depending on a driving state of a vehicle, according to various embodiments of the present disclosure.
Figure 7B:
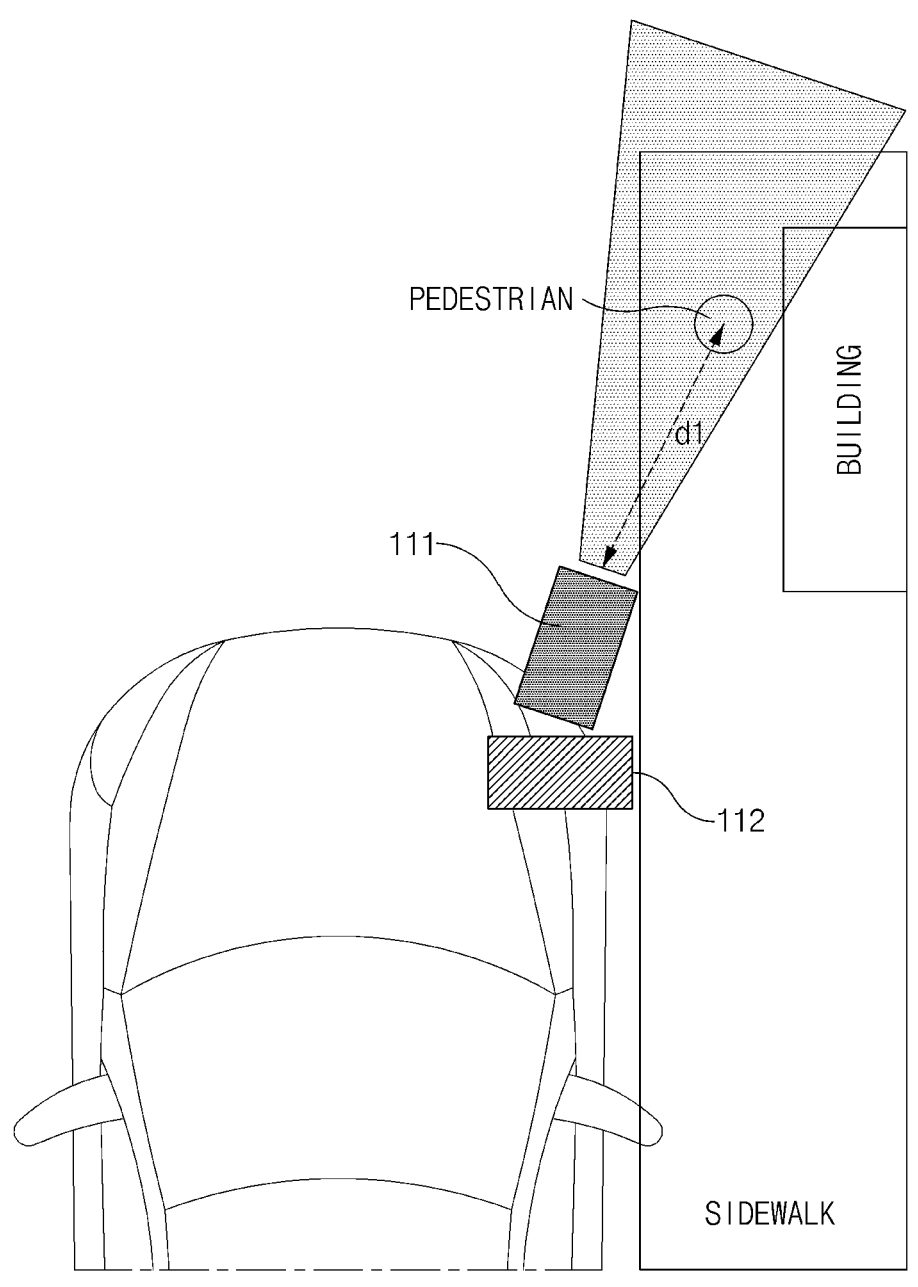
Figure 7C:
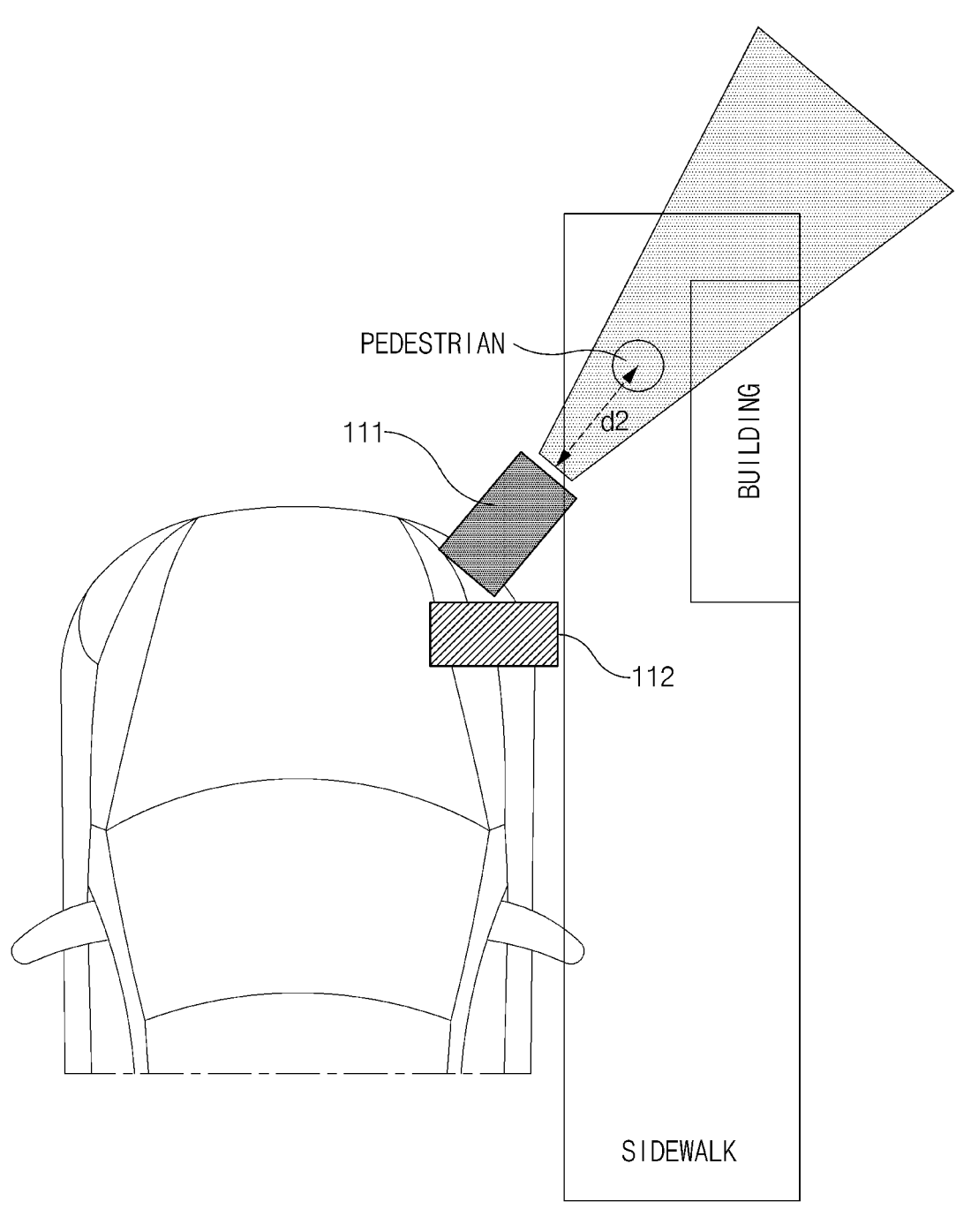

FIGS. 7A to 7C are diagrams for describing an operation of an object recognition module depending on a driving state of a vehicle, according to various embodiments.

Referring to FIGS. 7A to 7C, the TOF module 111 may photograph an object outside the vehicle by detecting lights returned after infrared rays emitted from the camera included in the TOF module 111 are reflected from the object (e.g., a pedestrian) outside the vehicle. When the TOF module 111 is non-rotatably fixed, a field of view (FOV) that the TOF module 111 can recognize may be limited. Due to the limitation of the field of view (FOV), the TOF module 111 may not recognize objects located on the left and right sides of the vehicle. In addition, when the vehicle is driven, since separation distances d1 and d2 between the TOF module 111 and the objects located on the left and right sides of the vehicle change in real time, it may be difficult to properly photograph the outside of the vehicle with the fixed TOF module 111.

Accordingly, the TOF module 111 of the embodiment may rotate while following the object through the first actuator 112. The TOF module 111 may recognize information on the distances d1 and d2 that are changed between the TOF module 111 and the object due to the driving of the vehicle. The first actuator 112 may rotate the TOF module 111 left and right such that the TOF module 111 may follow the object when the vehicle is traveling. The first actuator 112 may control the rotational operation of the TOF module 111 such that the rotational angle of the TOF module 111 increases as the separation distance between the vehicle traveling forward and the object becomes closer.

According to an embodiment, the TOF module 111 may recognize the separation distance between the vehicle and the object as the first distance d1 as illustrated in FIG. 7B. The first actuator 112 may control the TOF module 111 such that the TOF module 111 rotates toward the object at a first rotational angle corresponding to the first distance d1.

When the vehicle travels forward, the TOF module 111 may recognize the separation distance between the vehicle and the object as the second distance d2 shorter than the first distance d1 as illustrated in FIG. 7C. The first actuator 112 may control the TOF module 111 such that the TOF module 111 rotates toward the object at a second rotational angle corresponding to the second distance d2. The second rotational angle (e.g., 15 degrees) may be greater than the first rotational angle (e.g., 10 degrees).

The processor 120 may collect changed distance information from the TOF module 111. The processor 120 may prevent image distortion by correcting at least one of the driving information image or the walking information image, or any combination thereof, to correspond to the collected distance information.

Figure 8:
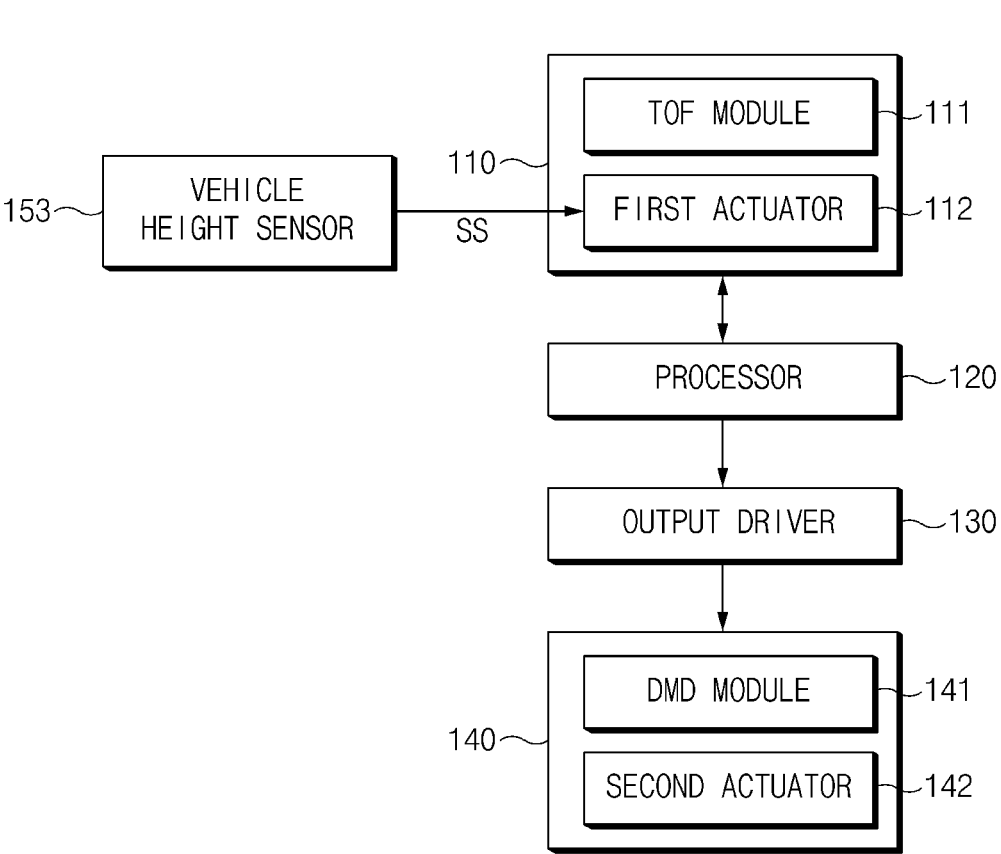
FIG. 8 is a block diagram illustrating a configuration of an information providing device used when driving on a slope disclosed in the present disclosure.

FIG. 8 is a block diagram illustrating a configuration of an information providing device used when driving on a slope disclosed in the present disclosure.

Referring to FIG. 8, the information providing device for a vehicle may include the vehicle height sensor 153, the object recognition module 110, the processor 120, the output driver 130, and the image output module 140.

The vehicle height sensor 153 may be mounted on a vehicle body. The vehicle height sensor 153 may detect a tilt of the vehicle, and may transmit a tilt sensing signal SS to the object recognition module 110 depending on the detected tilt.

The TOF module 111 may detect a recognition area ratio to the road surface when the vehicle is traveling. The recognition area ratio may be a ratio that the road surface occupies in an image of one screen photographed by the TOF module 111.

Figure 9:
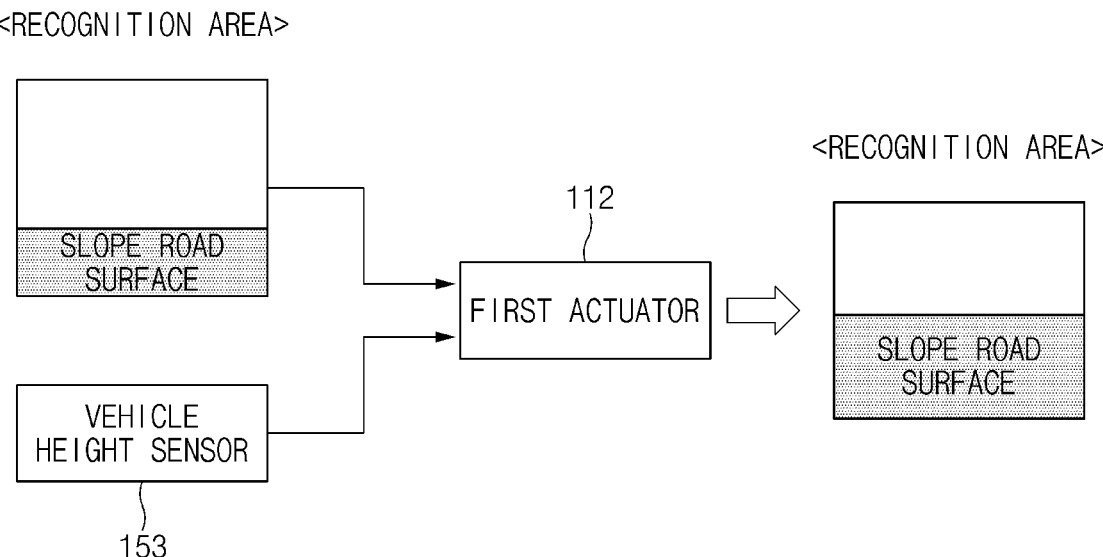
FIG. 9 is a diagram for describing an operation of a first actuator illustrated in FIG. 8.

The first actuator 112 may determine whether the vehicle is traveling on a slope based on the tilt sensing signal SS from the vehicle height sensor 153 and the recognition area ratio to the object, which is detected by the TOF module when vehicle is traveling. According to an embodiment, in a state in which a slope road surface recognition area recognized through the TOF module 111 does not reach a preset ratio as illustrated in FIG. 9, when the slope sensing signal SS is input from the vehicle height sensor 153, the first actuator 112 may determine that the vehicle is traveling on the slope.

When it is determined that the vehicle is traveling on a slope, the first actuator 112 may properly adjust the rotational angle of the TOF module 111. The first actuator 112 may adjust the rotation amount or the rotational angle of the TOF module 111 such that the slope road surface recognition area recognized through the TOF module 111 reaches a preset recognition area ratio.

The TOF module 111 may rotate to face the road surface on the slope under the driving of the first actuator 112 when the vehicle is traveling on the slope. The TOF module 111 may be disposed to be more inclined toward the road surface when the vehicle is traveling on a slope than when the vehicle is traveling on a flat road surface.

Figure 10A:
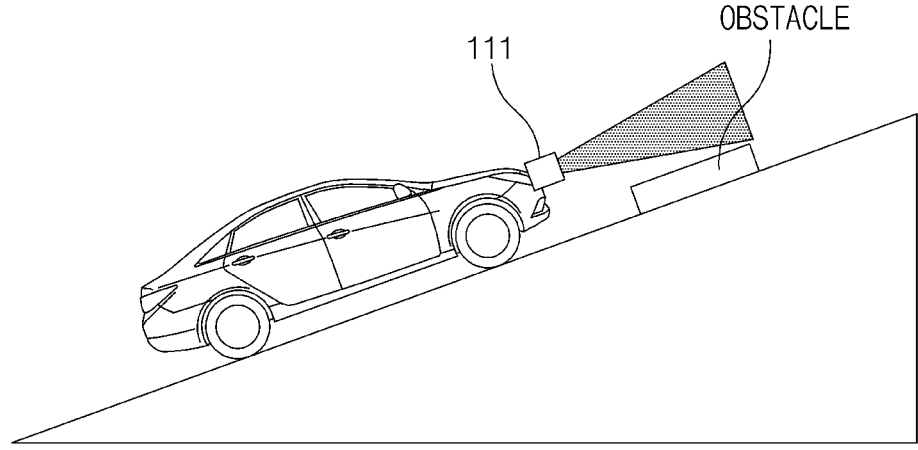
FIGS. 10A and 10B are diagrams for describing driving on a slope using an information providing device including a rotary TOF module.
Figure 10B:
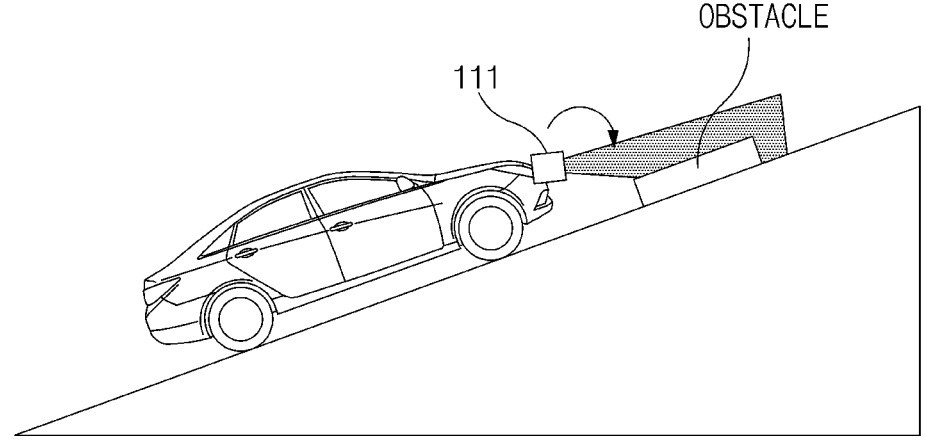

FIGS. 10A and 10B are diagrams for describing driving on a slope using an information providing device of an embodiment including a rotary TOF module.

As illustrated in FIG. 10A, the vehicle may travel on a slope in a state in which the TOF module 111 is aligned similarly to when the TOF module 111 travels on a flat road surface. The TOF module 111 may not recognize a road obstacle, which is an object outside the vehicle.

In this case, in a state in which the slope road surface recognition area recognized through the TOF module 111 does not reach a preset ratio, a tilt sensing signal output from the vehicle height sensor 153 may be input to the first actuator 112. The first actuator 112 may determine whether traveling on the slope in response to the slope road surface recognition area and the tilt sensing signal, and when it is determined that the vehicle is traveling on the slope, the first actuator 112 may appropriately adjust the rotational angle of the TOF module 111.

As illustrated in FIG. 10B, the vehicle may travel on the slope in a state in which the TOF module 111 is rotated more toward the road surface than when the TOF module 111 travels on a flat road surface. In this case, the TOF module 111 may easily recognize obstacles of the road surface.

According to various embodiments, the second actuator 142 may appropriately adjust the rotational angle of the DMD module 141 when the vehicle is traveling on a slope. The second actuator 142 may determine the rotation amount or angle of the DMD module 141 depending on the rotation amount or angle of the TOF module 111. Through the rotated DMD module 141, the driving information image may be easily recognized by the driver by being irradiated on the road surface of the slope.

Figure 11:
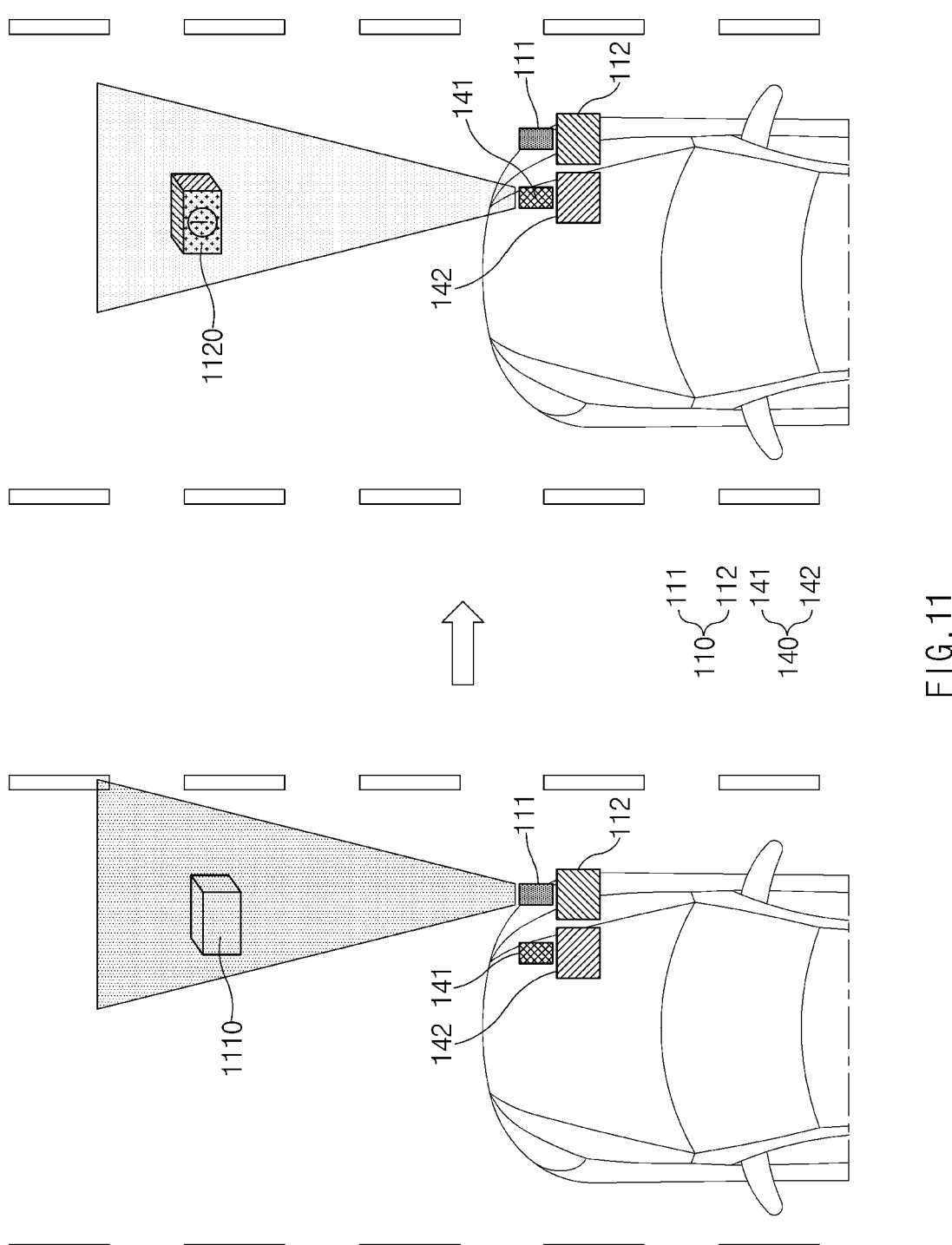
FIG. 11 is a diagram for describing first embodiments of irradiating a driving information image on a road irradiation area using an information providing device.
Figure 12:
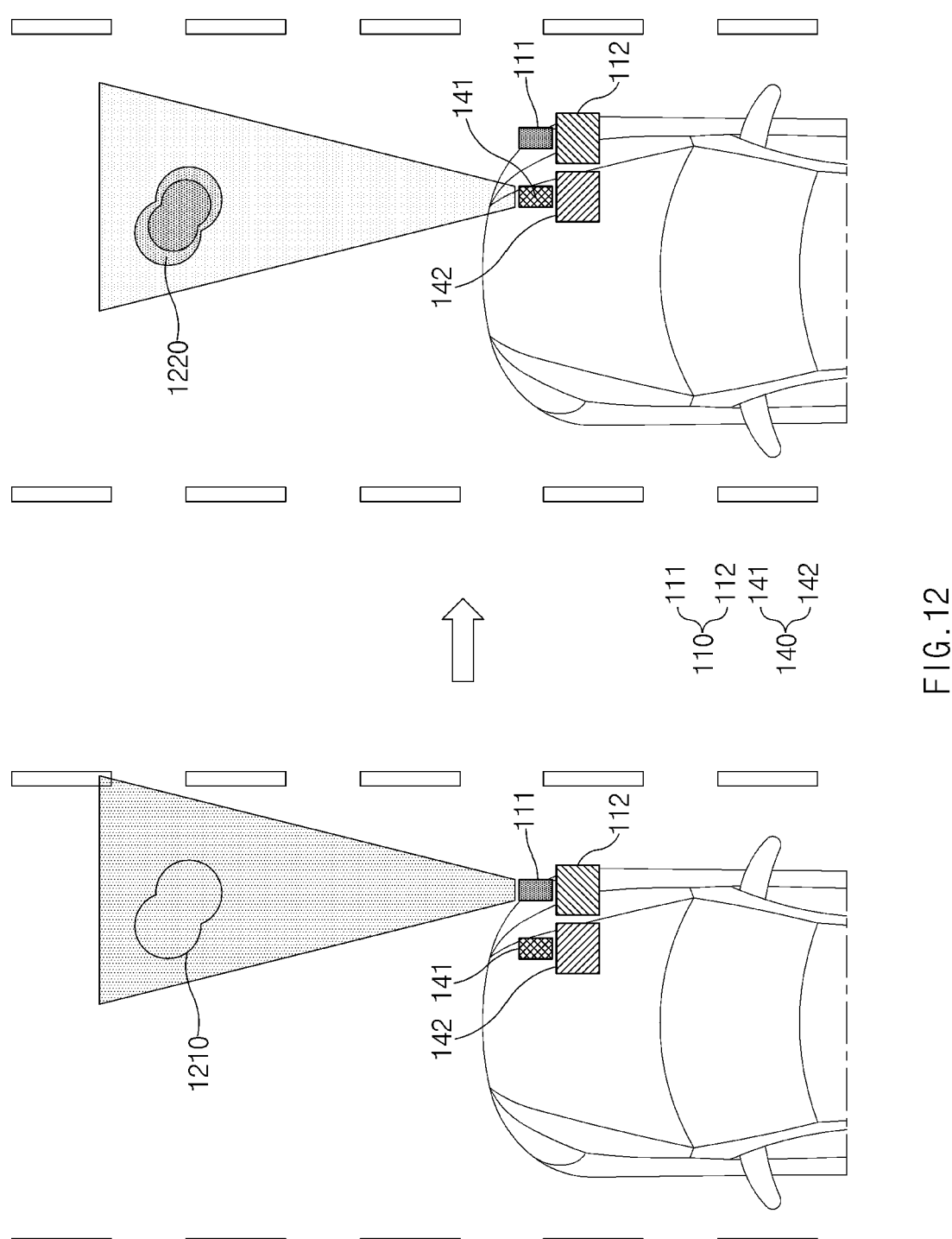
FIG. 12 is a diagram for describing second embodiments of irradiating a driving information image on a road irradiation area using an information providing device.

FIGS. 11 and 12 are diagrams for describing embodiments of irradiating a driving information image on a road irradiation area using an information providing device. The embodiments illustrated in FIGS. 11 and 12 will be described in connection with an information providing device illustrated in FIG. 1.

Referring to FIGS. 11 and 12, the object recognition module 110 may recognize at least one obstacle in a driving space by using the obtained image information. The obstacle may be at least one of a protruding obstacle 1110 illustrated in FIG. 11 and a recessed obstacle 1210 illustrated in FIG. 12. The protruding obstacle 1110 may have at least one surface higher than the road surface. For example, the protruding obstacle 1110 may be a falling object. The recessed obstacle 1210 may be formed to be recessed from the road surface. For example, the recessed obstacle may be a pot hole.

When the object recognition module 110 recognizes the protruding obstacle 1110 illustrated in FIG. 11, the processor 120 may generate a driving information image 1120 for mapping multiple surfaces of the protruding obstacle 1110 with complementary colors. The driving information image 1120 for mapping the multiple surfaces of the protruding obstacle 1110 with complementary colors may be irradiated on the road irradiation area through the image output module 140. Accordingly, the driver's recognition rate with respect to the protruding obstacle 1110 may be improved.

When the object recognition module 110 recognizes the recessed obstacle 1210 illustrated in FIG. 12, the processor 120 may generate a driving information image 1220 for mapping the recessed obstacle 1210 with at least two complementary colors. According to another embodiment, the processor 120 may generate the driving information image 1220 for mapping the recessed obstacle 1210 to change into at least two colors from the central area of the recessed obstacle 1210 to the outer area.

The driving information image 1220 for dividing the recessed obstacle 1210 into a plurality of areas and mapping the divided recessed obstacle 1210 with at least two colors may be irradiated on the road irradiation area through the image output module 140. Accordingly, the driver's recognition rate with respect to the recessed obstacle 1210 may be improved.

According to an embodiment of the present disclosure, the device and method for providing information for a vehicle may provide a driving information image capable of providing convenience to a driver on a road.

According to an embodiment of the present disclosure, the device and method for providing information for a vehicle may enhance a communication function with pedestrians by providing a walking information image that can provide convenience to pedestrians on the sidewalk.

According to an embodiment of the present disclosure, the device and method for providing information for a vehicle may minimize distortion of a driving information image and a walking information image irradiated to the road surface when the vehicle rotates.

In addition, various effects directly or indirectly identified through this document may be provided.

The various embodiments of this document and the terms used therein are not intended to limit the technology described in this document to a specific embodiment, but it should be understood to include various modifications, equivalents, and/or substitutions of the embodiments. With regard to the description of drawings, similar components may be marked by similar reference marks/numerals.

What is claimed is:

1. A device for providing information for a vehicle, the device comprising:

an object recognition circuit configured to take a front image of the vehicle and to recognize an object located outside the vehicle;

a processor configured to recognize a road surface as a road irradiation area, a sidewalk irradiation area, and a boundary area between the road irradiation area and the sidewalk irradiation area, based on the front image, and to generate a driving information image and a walking information image based on the front image; and an image output circuit configured to irradiate the driving information image adjusted to a size corresponding to the road irradiation area to the road irradiation area, and to irradiate the walking information image adjusted to a size corresponding to the sidewalk irradiation area to the sidewalk irradiation area, wherein a background color of the driving information image in the road irradiation area and a background color of the walking information image in the sidewalk irradiation area are different, wherein the device is included in the vehicle, and wherein the object recognition circuit is further configured to recognize a recessed obstacle of the road surface, and the image output circuit is further configured to output the driving information image for dividing the recessed obstacle into a plurality of areas and mapping the divided obstacle with at least two colors, wherein the plurality of areas include a central area and an outer area.

2. The device of claim 1, wherein the object recognition circuit includes:

a TOF (Time of Flight) circuit configured to obtain the front image of the vehicle; and a first actuator configured to control a rotational operation of the TOF circuit, wherein the image output circuit includes:

a DMD (Digital Micromirror Device) circuit configured to irradiate the walking information image and the driving information image onto the road surface; and a second actuator configured to control a rotational operation of the DMD circuit.

3. The device of claim 2, wherein at least one of the TOF circuit or the DMD circuit rotates toward the road surface corresponding to a driving direction when the driving direction of the vehicle is selected as a left turn or a right turn by a driver.

4. The device of claim 3, wherein the processor detects the driving direction of the left turn or the right turn based on information on a blinking of a turn indicator.

5. The device of claim 2, wherein the first actuator controls the rotational operation of the TOF circuit while following the object when the vehicle is traveling forward, and the processor corrects the walking information image depending on a changed distance between the vehicle and the object.

6. The device of claim 5, wherein the first actuator controls the rotational operation of the TOF circuit such that a rotational angle of the TOF circuit increases as a distance between the vehicle and the object becomes closer.

7. The device of claim 2, further comprising:

a vehicle height sensor configured to detect a tilt of the vehicle and to generate a tilt sensing signal, wherein the TOF circuit detects a recognition area ratio with respect to the road surface when the vehicle is traveling, and the first actuator determines whether the vehicle is traveling on a slope based on the tilt sensing signal and the recognition area ratio, and rotates the TOF circuit such that the TOF circuit faces the road surface of the slope when it is determined that the vehicle is traveling on the slope.

8. The device of claim 1, wherein the object recognition circuit recognizes a protruding obstacle of the road surface, and the image output circuit outputs the driving information image for mapping at least two surfaces of the protruding obstacle with complementary colors.

9. The device of claim 1, wherein the vehicle includes at least one lamp circuit emitting light to a front of the vehicle, and at least one of the object recognition module or the image output circuit is built into the lamp circuit.

10. A method for providing information for a vehicle, the method comprising:

taking a front image of the vehicle and recognizing an object located outside the vehicle;

recognizing a road surface as a road irradiation area, a sidewalk irradiation area, and a boundary area between the road irradiation area and the sidewalk irradiation area, based on the front image;

separately generating a driving information image and a walking information image based on the front image; and irradiating, by the vehicle, the driving information image adjusted to a size corresponding to the road irradiation area to the road irradiation area, and irradiating the walking information image adjusted to a size corresponding to the sidewalk irradiation area to the sidewalk irradiation area, wherein a background color of the driving information image in the road irradiation area and a background color of the walking information image in the sidewalk irradiation area are different, and wherein recognizing of the object includes recognizing a recessed obstacle of the road surface, and wherein irradiating of the driving information image to the road irradiation area includes outputting the driving information image obtained for dividing the recessed obstacle into a plurality of areas and mapping the divided obstacle with at least two colors, wherein the plurality of areas include a central area and an outer area.

11. The method of claim 10, wherein: the front image of the vehicle is obtained through a TOF (Time of Flight) circuit, a rotational operation of the TOF circuit is controlled through a first actuator connected to the TOF circuit, the walking information image and the driving information image are irradiated onto the road surface through a DMD (Digital Micromirror Device) circuit, and a rotational operation of the DMD circuit is controlled through a second actuator connected to the DMD circuit.

12. The method of claim 11, further comprising:

selecting, by a driver of the vehicle, a driving direction of the vehicle as one of a left turn or a right turn; and rotating at least one of the TOF circuit or the DMD circuit toward the road surface of a sidewalk corresponding to a rotation direction of the vehicle.

13. The method of claim 11, wherein recognizing of the object includes:

rotating the TOF circuit while following the object when the vehicle is traveling forward, and wherein the separately generating of the driving information image and a walking information image includes:

correcting the walking information image depending on a changed distance between the vehicle and the object.

14. The method of claim 13, wherein rotating of the TOF circuit while following the object includes:

rotating the TOF circuit such that a rotational angle of the TOF circuit increases as a distance between the traveling vehicle and the object becomes closer.

15. The method of claim 11, wherein recognizing of the object further includes:

generating a tilt sensing signal by detecting a tilt of the vehicle using a vehicle height sensor;

detecting a recognition area ratio with respect to the road surface using the TOF circuit when the vehicle is traveling;

determining whether the vehicle is traveling on a slope based on the tilt sensing signal and the recognition area ratio; and rotating the TOF circuit such that the TOF circuit faces the road surface of the slope when it is determined that the vehicle is traveling on the slope.

16. The method of claim 10, wherein recognizing of the object includes:

recognizing a protruding obstacle of the road surface, and wherein the irradiating of the driving information image to the road irradiation area includes outputting the driving information image for mapping at least two surfaces of the protruding obstacle with complementary colors.

17. The device of claim 1, wherein the image output circuit is configured to:

irradiate the driving information image and the walking information image without overlapping with each other.

18. The device of claim 1, wherein the image output circuit is configured to:

map, in a first manner, a color of a recessed obstacle of the road surface; and map, in a second manner that is different from the first manner, a color of a protruding obstacle of the road surface, to show recessed and protruding features.

* * * * *